(12) United States Patent
Hiwatashi et al.

(10) Patent No.: US 8,745,006 B2
(45) Date of Patent: Jun. 3, 2014

(54) COMPUTING SYSTEM AND BACKUP METHOD USING THE SAME

(75) Inventors: Junichi Hiwatashi, Ooi (JP); Masamitsu Takahashi, Chigasaki (JP); Atsushi Yuhara, Yugawara (JP)

(73) Assignee: Hitachi, Ltd., Tokyo (JP)

( * ) Notice: Subject to any disclaimer, the term of this patent is extended or adjusted under 35 U.S.C. 154(b) by 335 days.

(21) Appl. No.: 12/594,310

(22) PCT Filed: Apr. 23, 2009

(86) PCT No.: PCT/JP2009/058538
§ 371 (c)(1),
(2), (4) Date: Oct. 1, 2009

(87) PCT Pub. No.: WO2010/122676
PCT Pub. Date: Oct. 28, 2010

(65) Prior Publication Data
US 2011/0167044 A1    Jul. 7, 2011

(51) Int. Cl.
*G06F 17/30*    (2006.01)
*G06F 7/00*    (2006.01)

(52) U.S. Cl.
USPC .......................................... 707/653; 711/162

(58) Field of Classification Search
USPC ......................................... 707/610, 652–653
See application file for complete search history.

(56) References Cited

U.S. PATENT DOCUMENTS

| | | | |
|---|---|---|---|
| 6,647,474 B2 * | 11/2003 | Yanai et al. | 711/162 |
| 7,103,727 B2 * | 9/2006 | Morishita et al. | 711/147 |
| 7,139,851 B2 * | 11/2006 | Fujibayashi | 710/58 |
| 7,188,218 B2 * | 3/2007 | Morishita et al. | 711/147 |
| 7,343,461 B2 * | 3/2008 | Morishita et al. | 711/162 |
| 7,412,576 B2 * | 8/2008 | Yagawa | 711/161 |
| 7,523,204 B2 * | 4/2009 | D'Costa et al. | 709/226 |
| 7,523,408 B2 * | 4/2009 | Barrios et al. | 715/772 |
| 7,603,581 B2 * | 10/2009 | Boyd et al. | 714/6.23 |
| 7,818,522 B2 * | 10/2010 | Bartfai et al. | 711/162 |
| 8,055,943 B2 * | 11/2011 | Edel et al. | 714/20 |
| 2003/0158869 A1 * | 8/2003 | Micka | 707/203 |
| 2004/0260736 A1 * | 12/2004 | Kern et al. | 707/204 |
| 2006/0005074 A1 * | 1/2006 | Yanai et al. | 714/5 |
| 2006/0161721 A1 * | 7/2006 | Iwamura et al. | 711/100 |
| 2007/0011361 A1 * | 1/2007 | Okada et al. | 710/8 |
| 2007/0050574 A1 | 3/2007 | Kaiya et al. | |
| 2008/0104346 A1 | 5/2008 | Watanabe et al. | |
| 2008/0126725 A1 * | 5/2008 | Morishita et al. | 711/162 |
| 2008/0229038 A1 | 9/2008 | Kimura et al. | |

FOREIGN PATENT DOCUMENTS

| | | |
|---|---|---|
| JP | 2007-66162 A | 3/2007 |
| JP | 2008-134988 A | 6/2008 |
| JP | 2008-234030 A | 10/2008 |

* cited by examiner

*Primary Examiner* — Jeffrey A Burke
(74) *Attorney, Agent, or Firm* — Mattingly & Malur, PC

(57) ABSTRACT

This invention provides a computing system in which multiple remote copy destination sites exist and, even if a failure occurs in a copy source volume in a remote copy source site, it becomes possible in at least one remote copy destination site to establish backup in which data must be determined at a certain point in time. The computing system of this invention is characterized by, before the in-storage copy function performing in storage copy in the remote copy source site, setting the pair status of the remote copy destination volume in at least one storage system in multiple remote copy destination storage systems and the remote copy source volume to the mode for terminating remote copy and, after the in-storage copy is completed, changing the above-mentioned pair status to the mode for starting remote copy.

9 Claims, 18 Drawing Sheets

FIG.7

| REQUEST # | SO-VOL# | COPY RANGE STARTING POSITION | COPY RANGE ENDING POSITION | TA-VOL# | DIFFERENCE BITMAP |
|---|---|---|---|---|---|
| 0 | 0000 | 00000000 | 00010000 | 0010 | 0100111001······ |
| 1 | 0001 | 00010000 | 00020000 | 0011 | 1100011001······ |
| ... | ... | ... | ... | ... | ... |
| 52A | 52B | 52C | 52D | 52E | 52G |

FC PAIR CONTROL TABLE  508

| VOLUME # | COPY DESTINATION VOLUME # | PAIR STATUS | BITMAP TABLE | ... |
|---|---|---|---|---|
| 0210 | 0110 | IN COPY | 3-1 | ... |
| 0211 | 0111 | Simplex | 3-2 | ... |
| 0222 | 0112 | IN COPY | 3-3 | ... |
| 0223 | 0113 | Simplex | 3-4 | ... |
| : | : | : | : | ... |
| : | : | : | : | ... |

53B  53C  53D  53E

BIT ON (1): COPY TARGET
BIT OFF (0): NON-COPY TARGET

FIG.10

UR PAIR CONTROL TABLE    510

| VOLUME # | COPY DESTINATION SYSTEM # | COPY DESTINATION VOLUME # | JOURNAL GROUP # | PAIR STATUS | BITMAP TABLE | ... |
|---|---|---|---|---|---|---|
| 0110 | 3333 | 0320 | 0x02 | Duplex | 1-0 | ... |
| 0111 | 3333 | 0321 | NULL | Simplex | 1-1 | ... |
| 0112 | 3333 | 0322 | 0x02 | Duplex | 1-2 | ... |
| 0113 | 3333 | 0323 | NULL | Simplex | 1-3 | ... |
| : | : | : | : | : | : | ... |
| : | : | : | : | : | : | ... |

54A  54B  54C  54D  54E  54F

BIT ON (1): COPY TARGET
BIT OFF (0): NON-COPY TARGET

FIG.12

TC PAIR CONTROL TABLE          512

| VOLUME # | COPY DESTINATION SYSTEM # | COPY DESTINATION VOLUME # | PAIR STATUS | BITMAP TABLE | ... |
|---|---|---|---|---|---|
| 0110 | 2222 | 0603 | Suspend | 2-1 | ... |
| 0111 | 2222 | 0604 | Simplex | 2-2 | ... |
| 0112 | 2222 | 0605 | Duplex | 2-3 | ... |
| 0113 | 2222 | 0606 | Suspend | 2-4 | ... |
| : | : | : | : | : | ... |
| : | : | : | : | : | ... |
| 55A | 55B | 55C | 55D | 55E | |

COMPUTING SYSTEM AND BACKUP METHOD USING THE SAME

TECHNICAL FIELD

This invention relates to a computing system and backup method specifically, it is appropriate for the application to the computing system performing backup using the in-storage copy function and the remote copy function.

BACKGROUND ART

Conventionally, as a backup function provided in the storage system, the copy function of creating the mirrors of logical volumes in the same storage system without passing through the host (hereinafter referred to as the "in-storage copy function") exists.

Meanwhile, as another backup function provided in the storage system, the copy function of creating the mirrors of logical volumes between two storage systems (hereinafter referred to as the "remote copy function") is also well-known.

As the methods for remote copy using the remote copy function, the synchronous method by which remote copy to logical volumes as the backup destination is performed for data in synchronization with the data written to logical volumes and the asynchronous method by which remote copy to logical volumes as the backup destination is performed for data asynchronously with the data written to the logical volumes as the backup target exist.

In the synchronous method, after the data written to the logical volumes is copied to the logical volumes as the backup destination, a remote copy completion report is transmitted to the host. Therefore, the synchronous method has the problem that, though backup is highly reliable, if the distance between the two storage systems is large, remote copy takes a fair amount of time, which degrades the copy efficiency.

Meanwhile, the asynchronous method makes a remote copy completion report to the host when the data has been written to the logical volumes, and then remote copy is performed for the relevant data at the convenience of the storage systems of the copy source and the copy destination.

Therefore, the asynchronous method has the problem that, though copy can be performed efficiently even if the distance between the two storage systems is large, backup has lower reliability.

In view of that, the remote copy method combining the synchronous method and the asynchronous method for solving the respective problems has been proposed. This method locates the synchronous remote copy destination site relatively close to the remote copy source site, and locates the asynchronous remote copy destination site farther than the synchronous remote copy destination site.

This method is highly fault tolerant as backups exist in the synchronous remote copy destination site and in the asynchronous remote copy destination site respectively, and is known as the multi-target type remote copy.

SUMMARY OF INVENTION

Technical Problem

Recently, the backup method linking the in-storage copy function and the synchronous remote copy function has been proposed.

In the above-mentioned backup method, data written to a first logical volume in a storage system in a remote copy source site is copied to a second logical volume in the storage system in the remote copy source site and, for the data copied to the second logical volume, remote copy to logical volumes in storage systems in a synchronous remote copy destination site and an asynchronous remote copy destination site respectively is performed.

However, the above-mentioned backup method has the problem that, if a failure occurs in the second logical volume in the remote copy source site, this failure affects the synchronous remote copy destination site and the asynchronous remote copy destination site, and that it becomes impossible in either of the remote copy destination sites to establish backup (logical volumes) in which data must be determined at a certain point of time.

Therefore, this invention is intended for the purpose of providing a computing system and the backup method using the same in which multiple remote copy destination sites exist and, even if a failure occurs in the copy source volume of the remote copy source site, it becomes possible in at least one remote copy destination site to establish backup in which data must be determined at a certain point of time.

Solution to Problem

For achieving this purpose, the computing system of this invention is characterized by, before the in-storage copy function performs in storage copy in the remote copy source site, setting the pair status of the remote copy destination volume in at least one storage system in multiple remote copy destination storage systems and the remote copy source volume to the mode for terminating remote copy and, after the in-storage copy is completed, changing the above-mentioned pair status to the mode for starting remote copy.

Advantageous Effects of Invention

This invention can provide a computing system and the backup method using the same in which multiple remote copy destination sites exist and, even if a failure occurs in a copy source volume of the remote copy source site, it becomes possible in at least one remote copy destination site to establish backup in which data must be determined at a certain point of time.

BRIEF DESCRIPTION OF DRAWINGS

FIG. 7 is an FC request management table.

FIG. 8 is an FC pair management table.

FIG. 10 is a UR pair control table.

FIG. 12 is a TC pair control table.

DESCRIPTION OF EMBODIMENTS

Figure 1:
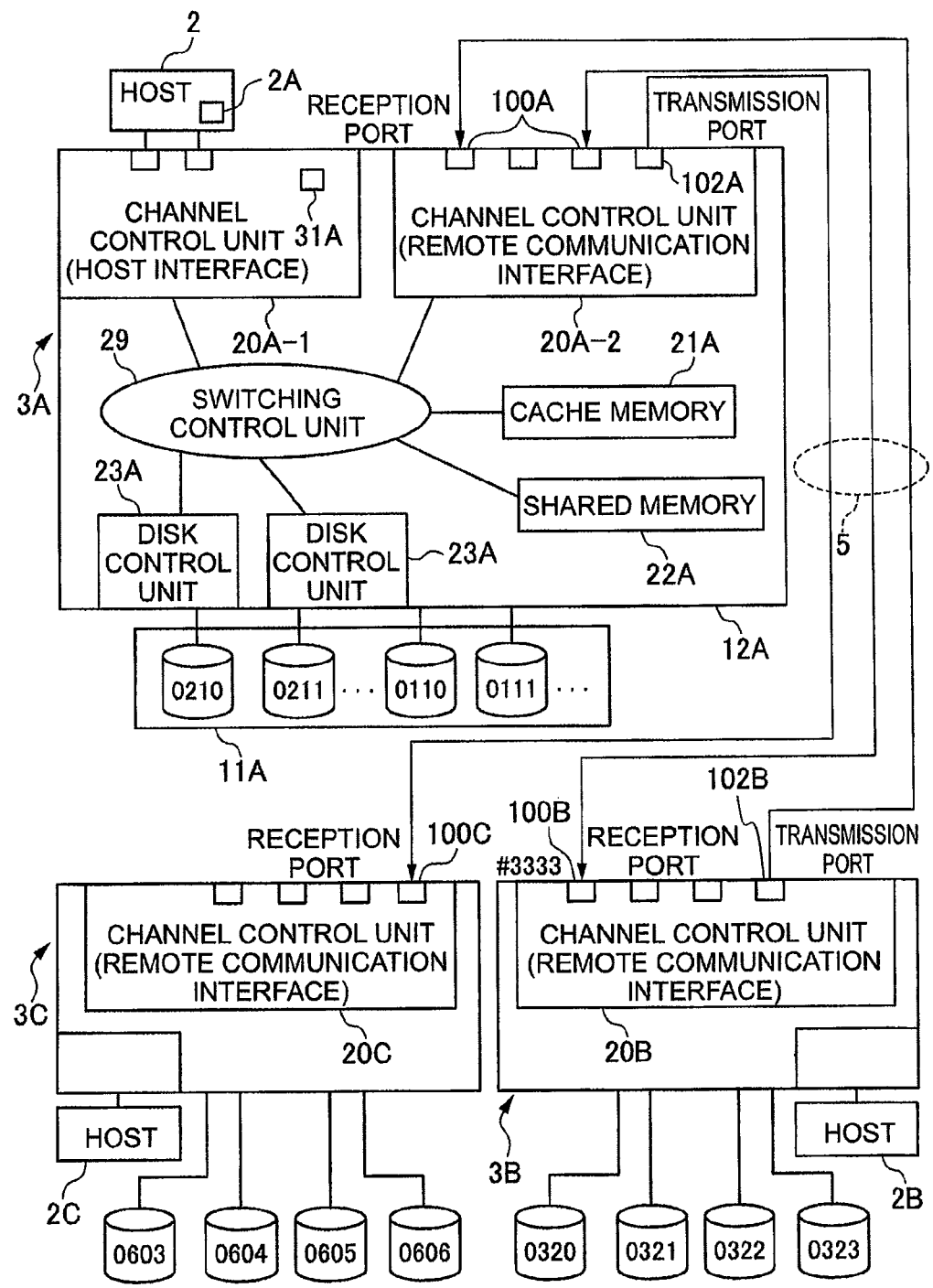
FIG. 1 is a hardware block diagram showing the entire configuration of an example of the computing system of this invention.

Next, an embodiment of this invention is described below. FIG. 1 is a diagram showing the hardware configuration of the computing system. This computing system includes a primary storage system 3A configuring a remote copy source site, a first secondary storage system 3B configuring an asynchronous remote copy destination site, and a second secondary storage system 3C configuring a synchronous remote copy destination site.

A reference sign 2 indicates a host computer (higher-level device) connected to the primary storage system 3A. The host computer is a computer device including information processing resources such as a CPU (Central Processing Unit) and memories and configured with, for example, a personal computer, a work station, a mainframe, and others.

The host computer 2 is installed at the same remote copy source site as the primary storage system 3A and connected to the primary storage system 3A via a communication path such as, for example, a cable, SAN (Storage Area Network), or LAN (Local Area Network).

For the host computer 2, application software (hereinafter simply referred to as an application) 2A is installed, and the host computer 2, based on this application 2A, performs specified data processing, and reads and writes required data from/to the primary storage system 3A via the communication path.

Note that a reference sign 2B indicates a host computer connected to the first secondary storage system 3B, and a reference sign 2C indicates a host computer connected to the second secondary storage system 3C.

The primary storage system 3A has a disk unit 11A including multiple disk drives. The disk drives are configured from disk devices, for example, expensive disks such as SCSI (Small Computer System Interface) disks and inexpensive disks such as SATA (Serial AT Attachment) disks, optical disks and others. Instead of disk drives, drives using other semiconductor memories such as flash memories may be used.

One RAID (Redundant Array of Inexpensive Disks) group is configured with one or multiple disk devices and, in the physical storage area provided by the storage devices configuring the one RAID group, one or multiple logical volumes are set. The data from the host 2 is stored in these logical volumes, in units of blocks (hereinafter referred to as logical blocks) of a specified size.

Reference signs 0210, 0211, . . . 0110, 0111, . . . indicate logical volumes in the primary storage system 3A. Reference signs 0320, 0321, . . . indicate logical volumes in the first secondary storage system, and reference signs 0603, 0604, . . . indicate logical volumes in the second secondary storage system.

To each logical volume, a unique volume number is given. In the case of this embodiment, an address is a combination of a volume number; and a number given to each logical block (Logical Block Address) and unique to the logical block, and data input/output is performed by specifying the relevant address.

Meanwhile, the control unit 12A is configured with multiple channel control units 20A-1, 20A-2, a cache memory 21A, a shared memory 22A, and multiple disk control units 23A. These are connected one another via a switching control unit 29.

The channel control units 20A-1, 20A-2 are each configured as microcomputer systems including microprocessors and memories. The channel control unit 20A-1 is equivalent to the host interface, and includes a port to be connected to the host computer.

Meanwhile, the channel control unit 20A-2 is equivalent to the remote communication interface for the communication with the storage systems in the remote copy destination site, and includes ports to be connected to the network between the remote copy source site and the remote copy destination site. A reference sign 100A indicates a reception port and 102A indicates a transmission port.

The first secondary storage system 3B also includes a channel control unit 20B as a remote communication interface. The channel control unit 20B includes reception ports 100B for receiving journal data from the primary storage system 3A and transmission ports 102B for transmitting commands for asynchronous remote copy to the primary storage system 3A and for other purposes. Note that a reference sign 20B indicates a channel control unit as the host interface of the first secondary storage system 3B.

The second secondary storage system 3C also includes a channel control unit 20C as a remote communication interface. The channel control unit 20C includes reception ports 100C for receiving synchronous remote copy data and commands from the primary storage system 3A. Note that a reference sign 20C indicates a channel control unit as the host interface of the second secondary storage system 3C.

The channel control units interpret and execute various types of commands given from the host computer and various types of commands transmitted from the other storage systems.

To the ports of each of the channel control units, network addresses (e.g. IP addresses and WWNs) for identifying each of them are assigned, which enable each channel adapter to individually operate as a NAS (Network Attached Storage).

The shared memory 22A is used mainly for storing: various types of control information such as system configuration information related to the configuration of the entire storage system; and commands. Meanwhile, the cache memory 21A is used mainly for temporarily storing data to be input/output to/from the storage system.

These various types of control information, commands, and others stored in the shared memory 22A and the cache memory 21A are shared by all the channel control units and all the disk control units in the primary storage system 3A.

The disk control units 23A are configured as microcomputer systems including microprocessors and memories, and operate as the interfaces performing protocol control in the communication with the disk device unit 11A.

Furthermore, the disk control units 23A, in accordance with the read/write requests from the host 2, control the corresponding disk devices in the disk device unit 11A, and read and write the required data from/to the relevant disk devices.

The first secondary storage system 3B and the second secondary storage system 3C are respectively installed in the sites separated from the remote copy source site in which the host computer 2 and the primary storage system 3A are installed, and connected to the primary storage system 3A via the network 5 configured with, for example, SAN, LAN, the Internet, a private line, a public line, and others.

Note that the hardware configurations of the secondary storage systems 3B, 3C are the same as the hardware configuration of the primary storage system 3A.

Next, the backup method in the computing system is described below. In the computing system, as the backup method for creating the backup of the data stored in the volumes in the primary storage system 3A by the host computer 2, the backup method linking the data copy between logical volumes performed in the same storage system and the asynchronous and synchronous remote copy performed among different storage systems is adopted.

Figure 2:
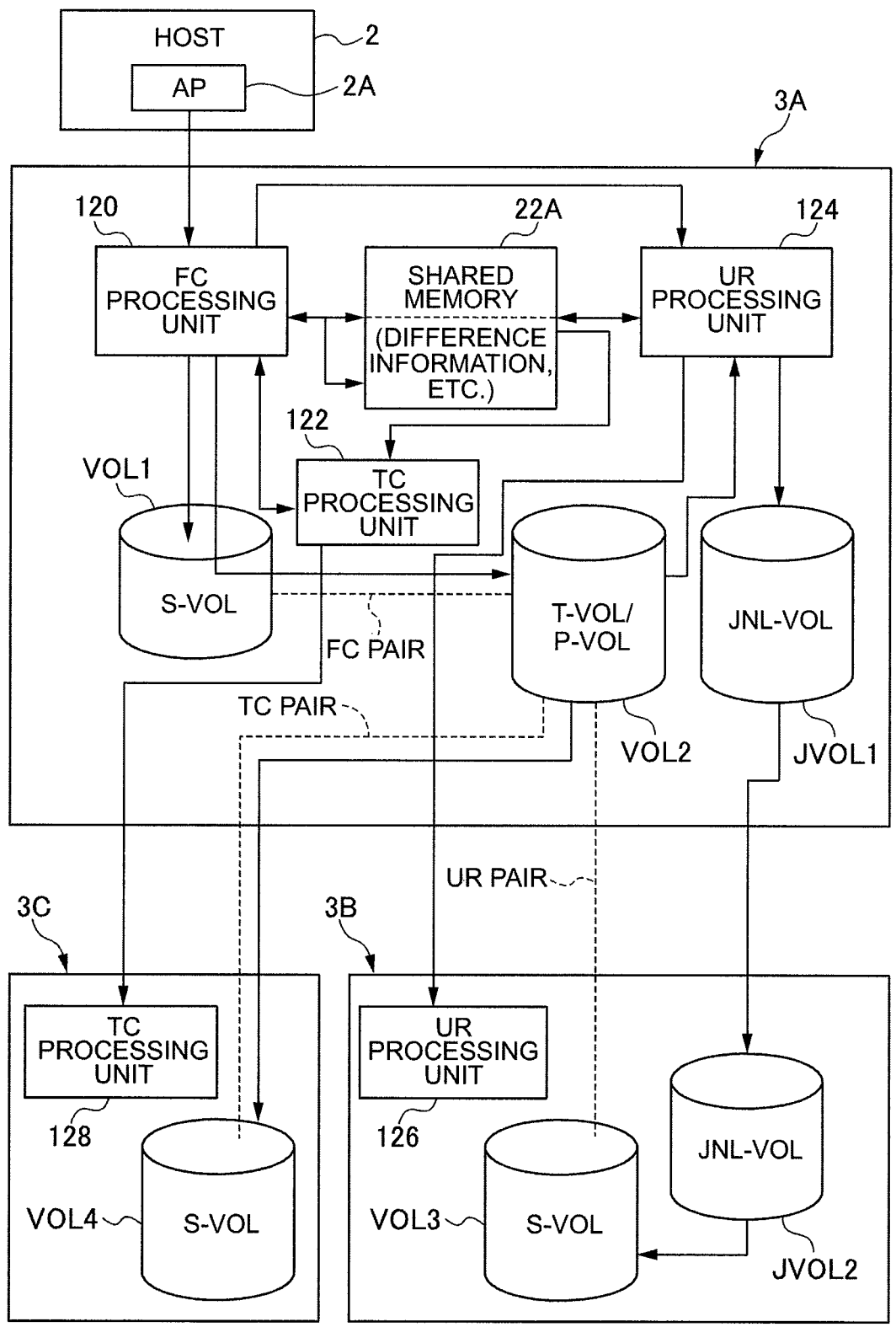
FIG. 2 is a function block diagram showing the backup method in the computing system.

That is, in the case of this computing system 1, as shown in FIG. 2, the data written to the first logical volume VOL1 in the primary storage system 3A is, in accordance with a request from the host computer 2, copied to the second logical volume VOL2 in the primary storage system 3A.

Then, the journal of the data copied to this second logical volume VOL2 is created, and this journal is stored in a journal volume (hereinafter referred to as a "primary journal volume") JVOL1 provided in the primary storage system 3A.

Meanwhile, for the journal stored in the primary journal volume JVOL1, asynchronously with the copy between the first and second logical volumes VOL1, VOL2, remote copy to a journal volume (hereinafter referred to as a "secondary journal volume") JVOL2 provided in the first secondary storage system 3B is performed.

After that, the journal is read from the secondary journal volume JVOL2, and the data included in this journal is stored in the corresponding position in the third logical volume VOL3 which is the backup volume of the first logical volume VOL1 (the position of the same address as the address in the first logical volume VOL1 where the data was stored).

Note that data copy performed between the logical volumes in the same storage system is hereinafter referred to as FC (Flash Copy) copy, and a pair of logical volumes between which FC copy is performed is referred to as an FC pair. Furthermore, the copy source volume in the FC pair is referred to as a source volume, and the copy destination volume is referred to as a target volume.

Therefore, data copy between the first and second logical volumes VOL1, VOL2 is equivalent to FC copy, and the pair of the first and second logical volumes is equivalent to an FC pair. Furthermore, in this FC pair, the first logical volume VOL1 is equivalent to the source volume, and the second logical volume VOL2 is equivalent to the target volume.

Meanwhile, remote copy using the journal performed between two logical volumes respectively provided in two different storage systems is hereinafter referred to as UR (Universal Replicator) copy, and a pair of logical volumes between which UR copy is performed is referred to as a UR pair. Furthermore, the copy source volume in the UR pair is referred to as a primary volume, and the copy destination volume is referred to as a secondary volume.

Therefore, remote copy between the second and third logical volumes VOL2, VOL3 is equivalent to UR copy, and the pair of these second and third logical volumes VOL2, VOL3 is equivalent to a UR pair. Furthermore, in this UR pair, the second logical volume VOL2 is equivalent to the primary volume, and the third logical volume VOL3 is equivalent to the secondary volume.

Incidentally, a journal is the update history information of a logical volume (first logical volume VOL1) which the host 2 reads and writes data from/to.

Figure 3:
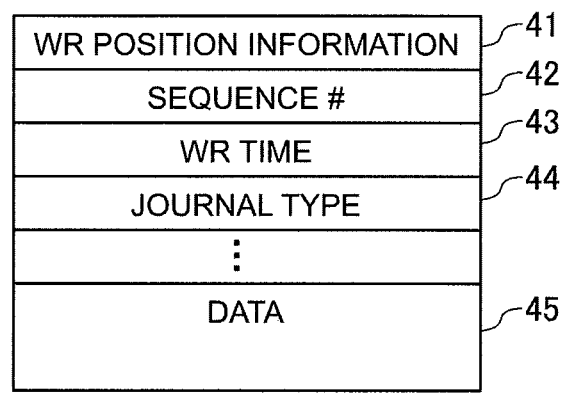
FIG. 3 is a conceptual diagram showing a journal conceptually.

As shown in FIG. 3, the journal 40 is composed of the write position information 41 showing the data write position in the logical volume, the sequence number 42 showing the journal group sequence number (serial number) given to the journal 40, the time information 43 showing the time when the data is written to the logical volume, the journal type information 44 showing the type of the journal, and the data 45 itself.

Note that the types of journals are: data journals which are created based on data when the data is written to the logical volumes; and control journals which are created for transmitting various types of control information to the storage system on the other end regardless of data write to the logical volume. Control journals are used, for example, when the primary storage system 3A issues an instruction for changing the pair status of a UR pair to the first secondary storage system 3B.

In contrast to UR copy, copy between the second logical volume VOL2 and the fourth logical volume VOL4 in the second secondary storage system 3C is synchronous remote copy which synchronizes with the accesses by the host computer.

This synchronous remote copy is referred to as TC (True Copy) copy and a pair of logical volumes between which TC copy is performed is referred to as a TC pair. Furthermore, the copy source volume in the TC pair is referred to as a primary volume, and the copy destination volume is referred to as a secondary volume.

Figure 4:
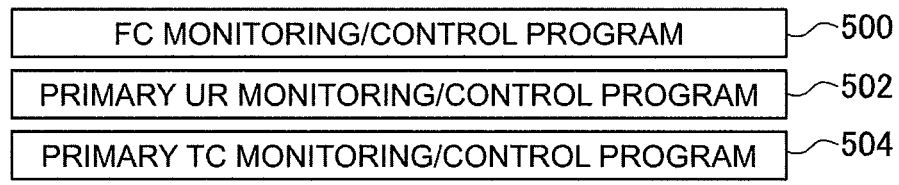
FIG. 4 is a block diagram showing the structure of the control programs stored in a channel control unit.

As a means for performing backup, the memory 31A in each channel control unit 20A in the primary storage system 3A, as shown in FIG. 4, stores the FC monitoring/control program 500, the primary UR monitoring/control program 502, and the primary TC monitoring/control program 504.

The FC processing unit 120 of the primary storage system 3A shown in FIG. 2 executes the FC monitoring/control program 500, the UR processing unit 124 executes the primary UR monitoring/control program 502, and the TC processing unit 122 executes the primary TC monitoring/control program 504.

Figure 5:
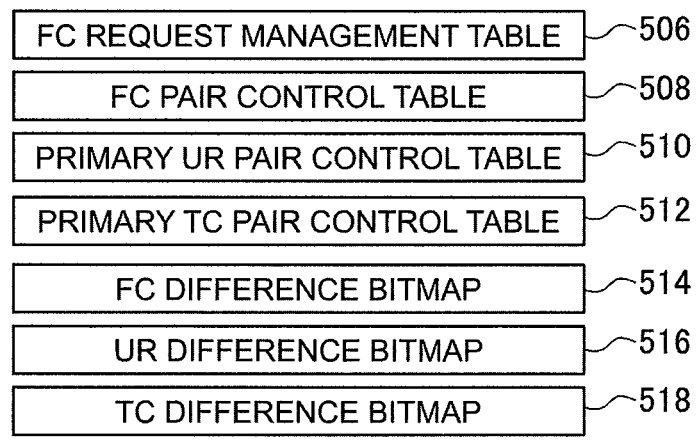
FIG. 5 is a block diagram showing the structure of the tables stored in a shared memory.

Meanwhile, the shared memory 22A in the primary storage system 3A, as shown in FIG. 5, stores the FC request management table 506, the FC pair control table 508, the primary UR pair control table 510, the primary TC pair control table 512, the FC difference bitmap 514, the UR difference bitmap 516, and the TC difference bitmap 518.

The FC monitoring/control program 500 is a program for monitoring and controlling FC copy between the first and second logical volumes VOL1, VOL2, the primary UR monitoring/control program 502 is a program for monitoring and controlling asynchronous copy (UR copy) between the second and third logical volumes VOL2, VOL3, on the primary storage system 3A side, and the primary TC monitoring/control program 504 is a program for monitoring and controlling synchronous copy (TC copy) between the second and fourth logical volumes VOL2, VOL4, on the primary storage system 3A side.

Furthermore, the FC request management table 506 is a table for managing and holding FC request commands issued from the host computer 2, in the primary storage system 3A. The FC request commands issued from the host computer 2 to the primary storage system 3A are stored in this FC request management table 506.

Figure 6:
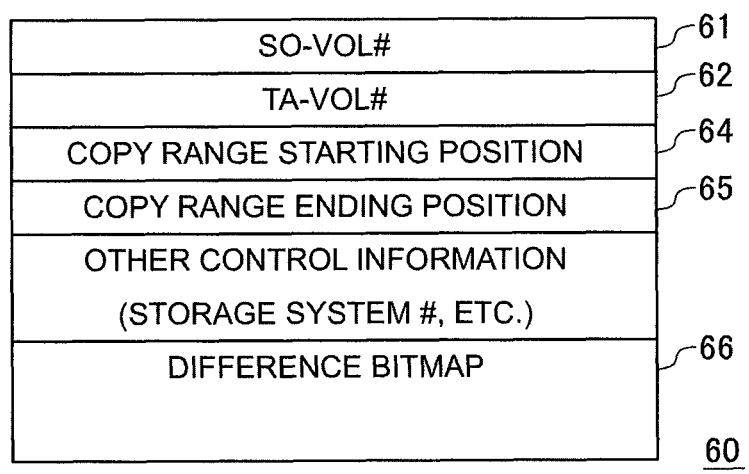
FIG. 6 is a block diagram showing the structure of an FC request command.

Incidentally, as shown in FIG. 6, an FC request command 60 is composed of the source volume number field 61, the target volume number field 62, the post-FC copy completion pair status flag field 63, the copy range starting position field 64, the copy range ending position field 65, the difference bitmap field 66, and others.

The source volume number field 61 and the target volume number field 62 respectively store the volume numbers of the source volume (first logical volume VOL1) and the target volume (second logical volume VOL2) that form the FC pair subjected to FC copy.

Furthermore, the copy range starting position field 64 and the copy range ending position field 65 respectively store the starting address and the ending address of the storage area in the source volume subjected to FC copy.

Furthermore, the difference bitmap field 66 stores the difference bitmap in which bits corresponding to, in the storage area subjected to FC copy, each of the unit areas updated by the host 2, are set to on ("1").

The FC request management table 506 is, corresponding to the FC request command having the above-mentioned structure, as shown in FIG. 7, composed of the request number field 52A, the source volume number field 52B, the copy range starting position field 52C, the copy range ending position field 52D, the target volume number field 52E, the post-FC copy completion pair status flag field 52F, and the difference bitmap field 52G.

The request number field 52A stores the sequence number given to the corresponding FC request command, the sequence number being unique to the FC request command. Furthermore, the source volume number field 52B, the target volume number field 52E, the copy range starting position field 52C, the copy range ending position field 52D, and the difference bitmap field 52G respectively store the information stored in the corresponding source volume number field 61, the target volume number field 62, the copy range starting position field 64, the copy range ending position field 65, and the difference bitmap field 66 in the FC request command.

The FC pair control table 508 is a table for managing the FC pair set based on the FC request command and, as shown in FIG. 8, is composed of the source volume number field 53B, the target volume number field 53C, the FC pair status field 53D, and the FC difference bitmap (table) 53E.

The source volume number field 53B and the target volume number field 53C respectively store the volume number of the source volume (first logical volume VOL1) and the volume number of the target volume (second logical volume VOL2) in the FC pair.

Meanwhile, the FC pair status field 53D stores the pair status of the FC pair. The pair status "in copy" is the status in which data copy from the source volume to the target volume is in progress and the source volume and the target volume have not become the mirror yet.

Furthermore, "Simplex" indicates the status in which data write to the target volume is not performed and the snapshot of the source volume at a certain point of time is maintained by this target volume.

The FC difference bitmap 53E is a bitmap for managing the copy progress status in FC copy and, if there are multiple first logical volumes VOL1, the bitmap is created for each first logical volume VOL1.

Figure 9A:
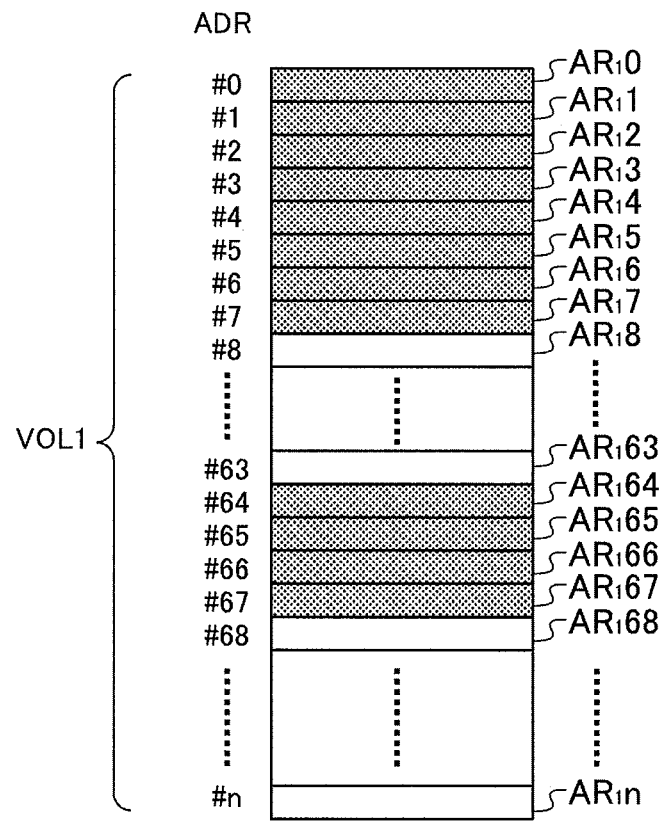
FIG. 9, which is comprised of FIG. 9A and FIG. 9B, is a block diagram for the description of an FC difference bitmap.
Figure 9B:
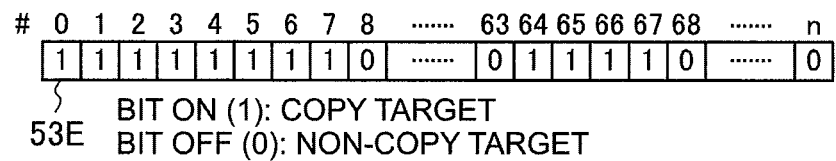

This FC difference bitmap 53E is, as shown in FIG. 9(B), a bitmap in which bits are provided respectively corresponding to each unit area to which the corresponding address in the first logical volume VOL1 is given, and the bits made to correspond to the copy target unit areas in the first logical volume VOL1 (shaded unit areas $AR_1 0$ to $AR_1 7$, $AR_1 64$ to $AR_1 67$, ... in FIG. 9(A)) are set to on ("1") while the bits made to correspond to the unit areas which are not the copy target (shaded unit areas $AR_1 8$ to $AR_1 63$, ..., $AR_1 n$ in FIG. 9(A)) are set to off ("0"). Note that the unit areas are logical blocks.

Meanwhile, the primary UR pair control table 510 is a table for managing asynchronous remote copy (UR copy) performed between the second and third logical volumes VOL2, VOL3, on the primary storage system 3A side.

This primary UR pair management table 510 is, as shown in FIG. 10, composed of the primary volume number field 54A, the asynchronous remote copy destination storage system (first secondary storage system 3B) number field 54B, the secondary volume number field 54C, the journal group (group formed by JVOL1 and JVOL2) number field 54D, the UR pair status field 54E, and the UR difference bitmap (table) 54F.

The UR pair status field 54E stores the status of the UR pair. "The UR pair status" includes "Duplex," "Duplex-Pending," "Suspend," and "Simplex."

Duplex indicates the status in which remote copy from the copy source volume to the copy destination volume functions normally, volumes are duplicated, and, at the same time, even if a failure occurs in the copy source volume, it is possible to switch (fail over) to the copy destination logical volume.

The Simplex status indicates the same operation status as of a normal single storage in which a remote copy pair is not created. The Suspend status indicates the status in which, after a remote copy pair is created, remote copy is suspended.

The Duplex-Pending status indicates the status in which, though copy for creating a remote copy pair is started and the synchronization processing is being performed, copy for creating a pair is in progress and, at that point of time, switching (fail over) to the copy destination cannot be performed yet.

The UR difference bitmap (table) 54F is a bitmap for managing the copy progress status in UR copy and, if there are multiple second logical volumes VOL2, the bitmap is created for each second logical volume VOL2.

Figure 11A:
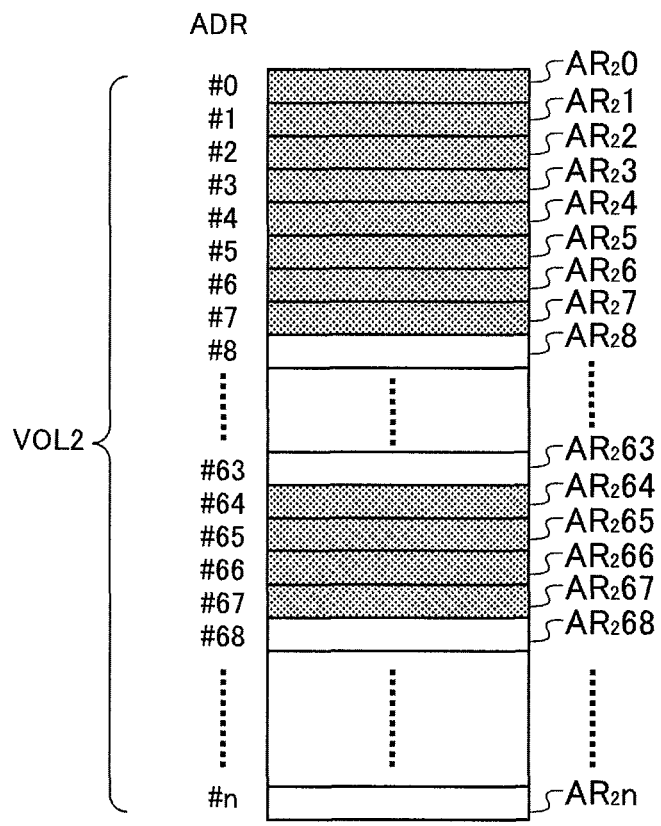
FIG. 11, which is comprised of FIG. 11A and FIG. 11B, is a block diagram for the description of a UR difference bitmap.
Figure 11B:
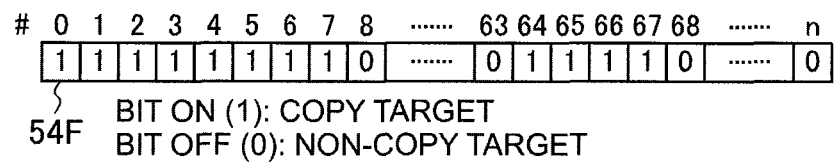
Figure 13A:
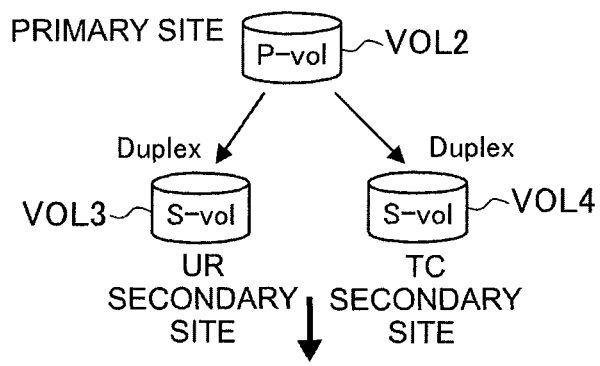
FIG. 13, which is comprised of FIGS. 13A-13F, is a block diagram showing the transition of the pair status between the logical volumes where in-storage backup and backup using remote copy are linked.
Figure 13B:
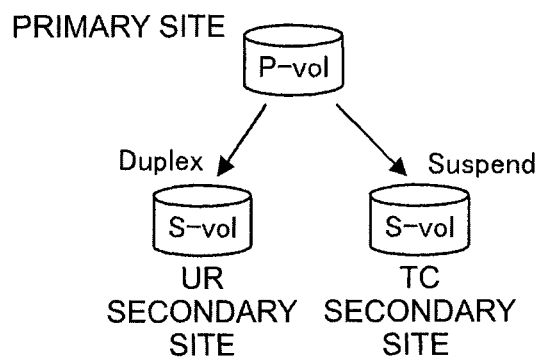
Figure 13C:
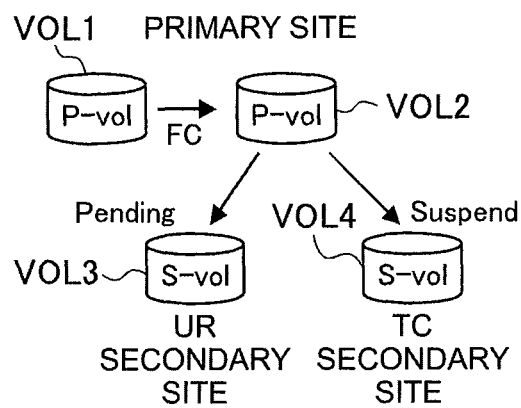
Figure 13D:
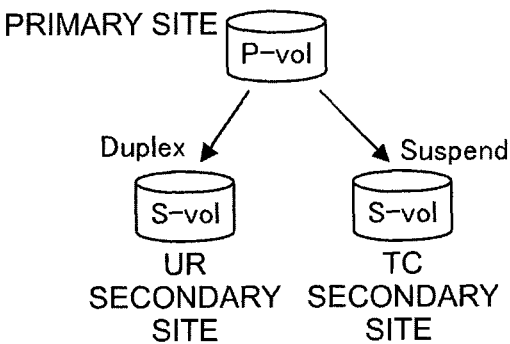
Figure 13E:
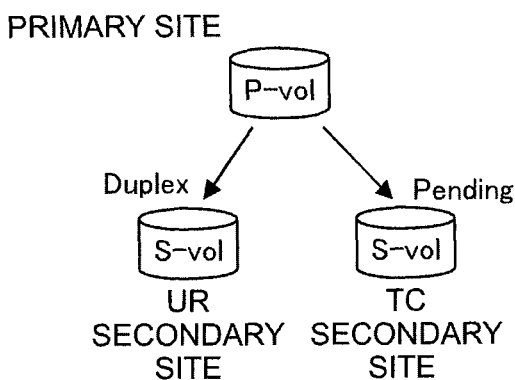
Figure 13F:
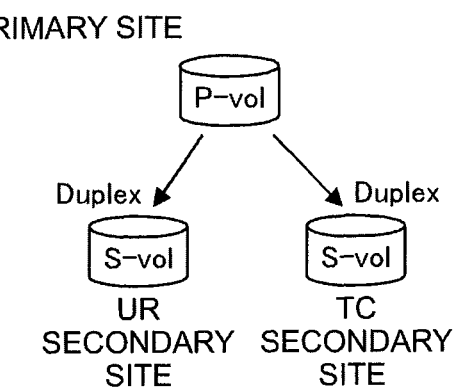

This UR difference bitmap 54F is, as shown in FIG. 11(B), a bitmap in which bits are provided respectively corresponding to each unit area to which the corresponding address in the second logical volume VOL2 is given, and the bits made to correspond to the copy target unit areas in the second logical volume VOL2 (shaded unit areas $AR_2 0$ to $AR_2 7$, $AR_2 64$ to $AR_2 67$, ... in FIG. 11(A)) are set to on ("1") while the bits made to correspond to the unit areas which are not the copy target (shaded unit areas $AR_2 8$ to $_2 63$, ..., $AR_2 n$ in FIG. 11(A)) are set to off ("0").

As a means for performing asynchronous remote copy on the secondary storage system side, the memory in the channel control unit 20B in the first secondary storage system 3B as the asynchronous remote copy destination site stores the secondary UR monitoring/control program, and the shared memory in the secondary storage system 3B stores the secondary UR pair management table.

The secondary UR monitoring/control program is a program for monitoring and controlling UR copy between the second and third logical volumes VOL2, VOL3, on the first secondary storage system 3B side.

Meanwhile, the secondary UR pair management table is a table for managing UR between the second and third logical volumes VOL2, VOL3, on the secondary storage system 3B side. The management and control of asynchronous remote copy on the first secondary storage system 3B side is performed by the UR processing unit 126.

The primary TC pair control table 512 is a table for managing synchronous remote copy (TC) between the second and fourth logical volumes VOL2, VOL4, on the primary storage system 3A side.

This primary TC pair management table 510 is, as shown in FIG. 12, composed of the primary volume number field 55A, the synchronous remote copy destination storage system (first secondary storage system) number field 55B, the secondary volume number field 55C, the pair status field 55D, and the TC difference bitmap (table) 55E. The pair status field 55D stores the status of the TC pair.

The TC difference bitmap 55E is a bitmap for managing the copy progress status in TC. This TC difference bitmap 54F is, like FIG. 11, a bitmap in which bits are provided respectively corresponding to each unit area to which the corresponding address in the second logical volume VOL2 is given.

The memory in the channel adapter 20C in the secondary storage system 3C stores the secondary TC monitoring/control program, and the shared memory in the secondary storage system 3C stores the secondary TC pair management table.

Among these, the secondary TC monitoring/control program is a program for monitoring and controlling TC between the second and fourth logical volumes VOL2, VOL4, on the second secondary storage system 3C side.

Meanwhile, the secondary TC pair management table is a table for managing TC performed between the second and fourth logical volumes VOL2, VOL4, on the secondary storage system 3C side. The management and control of asynchronous remote copy on the second secondary storage system 3C side is performed by the TR processing unit 128.

Next, the linked backup processing where in-storage backup and backup using remote copy are linked is described below. FIG. 13 shows the process of this linked backup and shows the process of changing the pair status among the second logical volume VOL2 as the remote copy source volume in the primary storage system 3A, the third logical volume as the asynchronous remote copy destination volume in the first secondary storage system 3B, and the fourth logical volume VOL4 as the asynchronous remote copy destination volume in the first secondary storage system 3B.

The second logical volume VOL2 and the third logical volume VOL3 create a UR pair, and the second logical volume VOL2 and the fourth logical volume VOL4 create a TC pair.

Figure 14A:
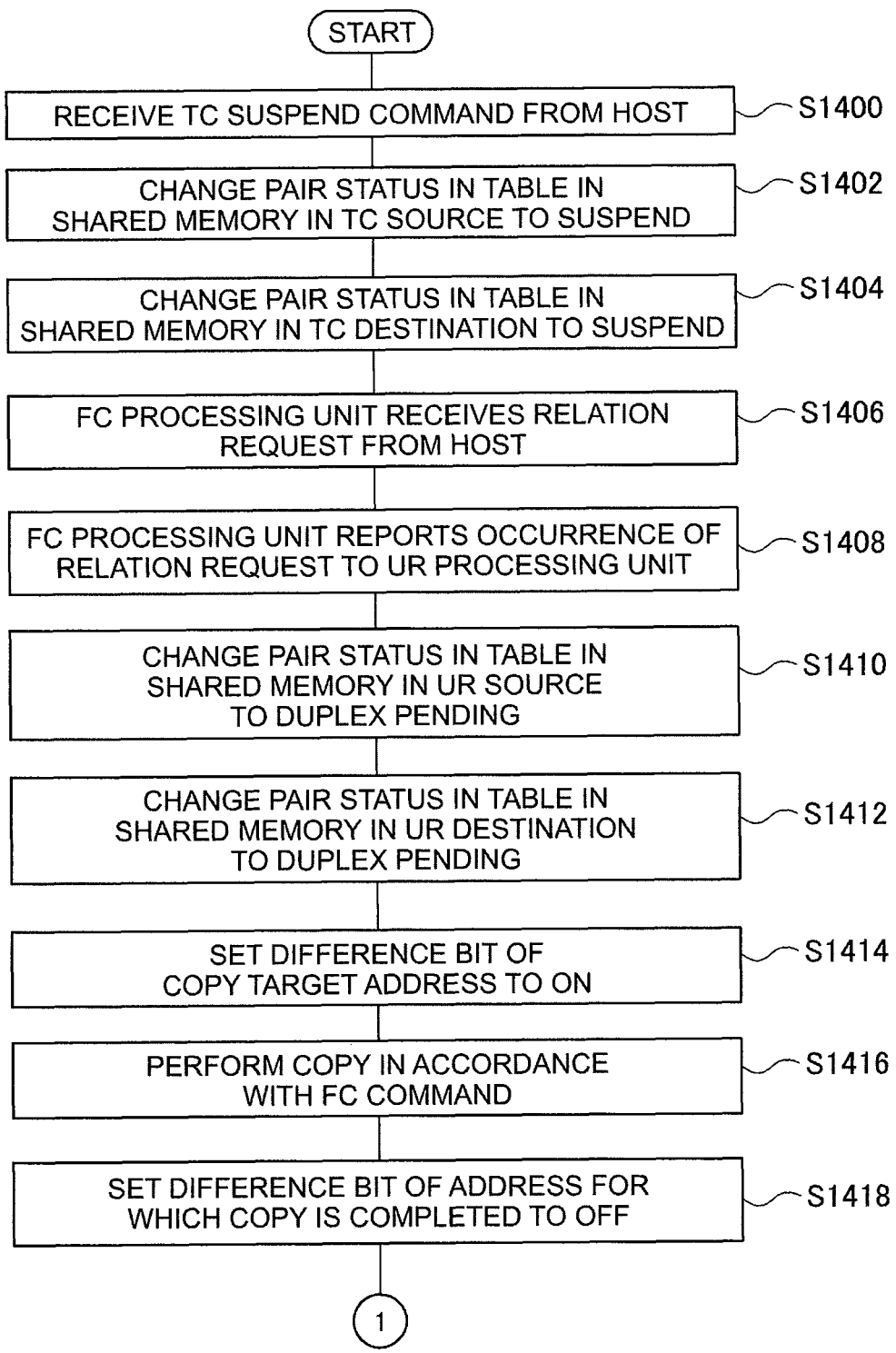
FIG. 14, which is comprised of FIG. 14A and FIG. 14B, is a flowchart performed by the computing system for realizing the transition in FIG. 13.
Figure 14B:
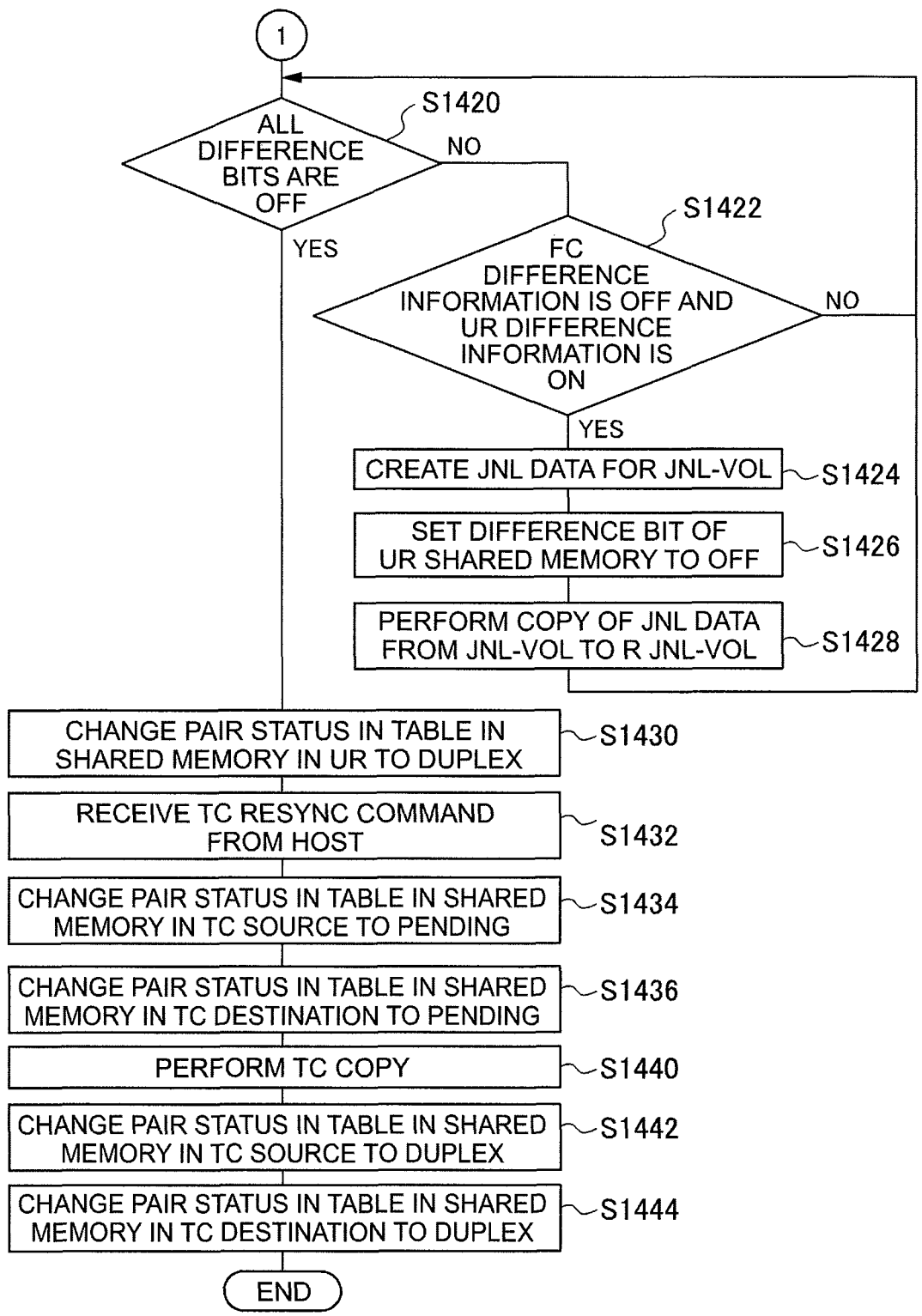

The process of the linked backup processing in FIG. 13 is described below, also with reference to the flowchart in FIG. 14. FIG. 13 (A) shows that the pair status of the primary volume VOL2 and the secondary volumes VOL3, VOL4 is "Duplex" in which remote copy from the primary volume to the secondary volumes functions normally, the logical volumes are duplicated, and, at the same time, even if a failure occurs in the copy source volume, it is possible to switch (fail over) to a copy destination volume.

In this status, if the administrative user of the host computer 2 requests the linked backup processing, the FC processing unit 120 in the primary storage system 3A receives a command for changing the TC pair status from "Duplex" to "Suspend" from the host computer 2 (S1400 in FIG. 4).

In (B), the FC processing unit 120, executes the FC monitoring/control program 500 and transmits the command to the TC processing unit 122. The TC processing unit 122 executes the TC monitoring/control program 504, accesses the TC pair control table 512 in the shared memory 22A, and changes the TC pair status 55D from "Duplex" to "Suspend" (S1402).

As a result, the synchronous remote copy destination volume VOL4, when the pair status is changed to Suspend, becomes the determined backup volume of the primary volume VOL2.

The TC processing unit 122 transmits the command to the TC processing unit 128 in the synchronous remote copy destination storage system 3C, refers to the shared memory in the storage system 3C, and changes the TC pair status in the same way (S1404).

Next, in (C), the FC processing unit 120 receives a request for linked backup (relation request) for relating remote copy to FC copy, from the host computer 2 (S1406).

The FC processing unit 120 reports the occurrence of the relation request to the UR processing unit 124 (S1408). The UR processing unit 124 executes the UR monitoring/control program 502, accesses the UR pair control table in the shared memory 22A, and changes the UR pair status 54E from "Duplex" to "Duplex Pending" (S1410).

The UR processing unit 124 accesses the UR processing unit 126 in the synchronous remote copy destination storage system 3B, accesses the UR pair control table in the storage system 3B, and changes the UR pair status from "Duplex" to "Duplex Pending" in the same way (S1412).

The FC processing unit 120 accesses the FC difference bitmap 53E and the UR difference bitmap 54F in the shared memory 22, and sets the bits of the areas corresponding to the FC copy target addresses in the source volume VOL1 to On in both of the tables (S1414).

Next, the FC processing unit 120 changes the FC pair status in the FC pair control table 508 from "Simplex" to "In copy (Duplex Pending)," executes the FC command from the host computer 2, and performs FC copy from the source volume VOL1 to the target volume VOL2 (S1416).

Figure 15:
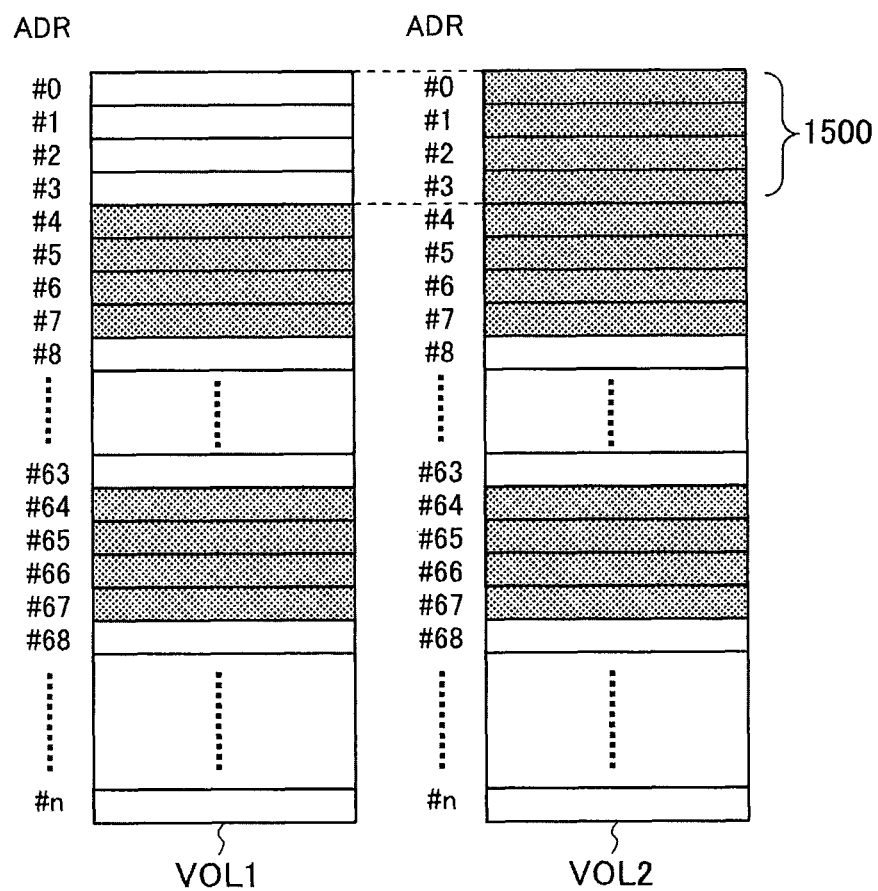
FIG. 15 is a block diagram for the description of journal creation processing.

The FC processing unit 120, each time FC copy is completed, sets the difference bit of a relevant address in the source volume VOL1 to Off (S1418). In FIG. 15, a reference sign 1500 indicates the address range of the source volume whose difference bitmaps are set to Off (shaded→not shaded).

Next, the FC processing unit 120 determines whether all the bits in the source volume VOL1 are set to Off or not (S1420). If FC copy is in progress, this is determined to be negative, and the process proceeds to the determination in S1422.

The UR processing unit 124, as shown in FIG. 15, compares the bitmap of the source volume VOL1 with the bitmap of the target volume VOL2, and determines whether there is an area in which the former (FC difference information) is off and the latter (UR difference information) is on or not. The reference sign 1500 in FIG. 15 falls into this area. This is an area where FC copy has been completed and is subject to remote copy.

The UR processing unit 124, when the determination is positive, creates journal data by copying the difference data from the remote copy source volume VOL2 to the journal volume JVOL1.

Next, the UR processing unit 124 sets the difference bits on the areas in the primary volume from which the creation of journal data is completed to off (S1426). Then, [the UR processing unit 124] performs journal data copy from the journal volume JVOL in the primary storage system 3A to the journal volume JVOL2 in the first secondary storage system.

The FC processing unit 120 and the UR processing unit 124 repeat the processing from S1422 to S1428 until there is no more FC difference data.

In (D), the FC processing unit 120, if there is no more FC difference data, makes a positive determination in S1420. As a result, the UR processing unit 124 accesses the UR pair control table 510 stored in the shared memory 22A, and changes the UR pair status from "Duplex Pending" to "Duplex" (S1430). At this point in time, the UR volume VOL3 becomes the determined backup volume of the primary volume VOL1.

Next, in (E), the FC processing unit 120 receives a command for re-synchronizing the TC pair from the host computer 2 (S1432). The TC processing unit 122 in the primary storage system 3A sets the TC pair status in the TC pair control table 512 in the shared memory 22A to "Duplex Pending" (S1434). The TC processing unit 128 in the synchronous remote copy destination storage system 3C also sets the TC pair status to "Duplex Pending" in its TC pair control table.

Next, the TC processing unit executes the Resync command and copies the difference data of the synchronous remote copy source volume VOL2 to the synchronous remote copy destination volume VOL4 (S1440).

Then, the TC processing units 122, 128 change the TC pair status from "Duplex Pending" to "Duplex" (S1442, S1444).

During the in-storage copy processing ((B) to (D)), the volume in the TC site and the primary volume are in a Suspend status, i.e., the volume in the TC site is protected from the pair creation with the primary volume, and therefore, even if in-storage copy and remote copy are linked and a failure occurs in the primary volume in the remote copy source site, the volume in the TC site can be handled as a determined backup volume.

Figure 16:
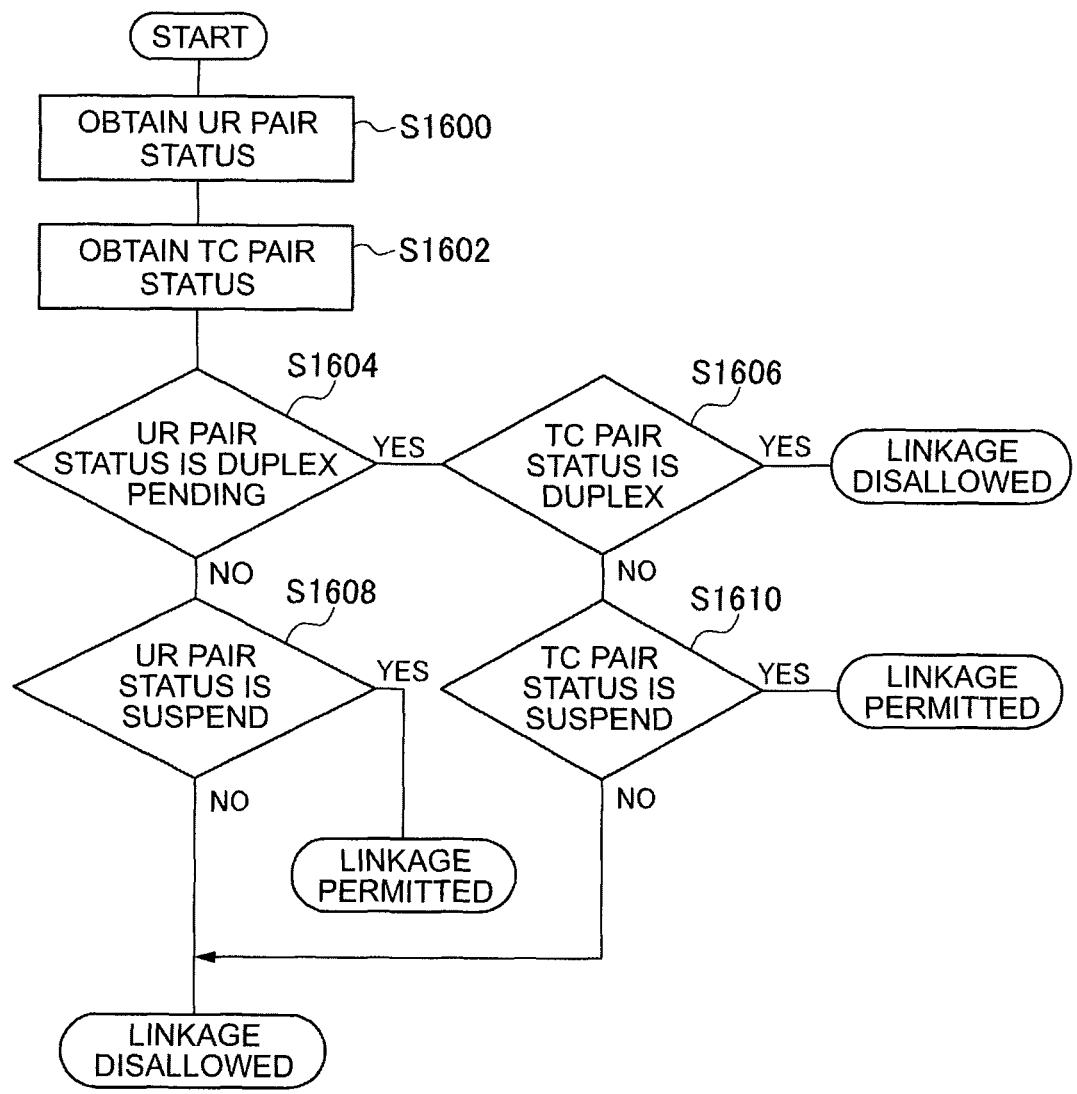
FIG. 16 is a flowchart for the description of an example of the determination on whether to link in-storage copy and inter-storage copy or not.

FIG. 16 is an example of the determination on whether to link in-storage copy and inter-storage copy or not. Linkage permitted means that the backup volume determined at a certain point in time can be performed while linkage not-permitted means that this cannot be performed.

The primary storage system performs this processing when performing FC copy. The FC processing unit 122, the TC processing unit, or the UR processing unit 124 obtains the UR pair status (S1600), and obtains the TC pair status (S1602). If the UR pair status is "Duplex Pending" in the step S1604, the processing proceeds to the step S1606. If the TC pair status is "Duplex," linkage is determined to be not-permitted because remote copy with the primary volume is performed both for the UR pair and the TC pair during the in-storage copy and because, if a failure occurs (e.g. hard disk is blocked) in the primary volume during the in-storage copy, the determined backup volume does not exist.

Meanwhile, if the TC pair status is Suspend in S1610, linkage is determined to be permitted because the TC destination volume is protected from the primary volume. When the UR pair status is determined not as "Duplex Pending" in the step S1604, if the UR pair status is Suspend in the step S1608, linkage is determined to be permitted because the UR destination volume is protected. If negative determinations are made in steps S1608 and S1610, linkage is determined to be not-permitted because the pair statuses of both the UR pair and the TC pair are uncertain.

Though, in the above-mentioned embodiment, the volume in the synchronous remote copy destination is protected, it may also be permitted to protect the volume in the asynchronous remote copy destination or to protect both.

INDUSTRIAL APPLICABILITY

This invention can be broadly applied to computing systems performing backup using the in-storage copy function and the remote copy function.

What is claimed is:

1. A computing system comprising:
a remote copy source storage system; and
a first and a second remote copy destination storage systems,
wherein,
the remote copy source storage system includes:
a first volume accessed by a host computer; and
a second volume, wherein a local copy pair is set between the first volume and the second volume,
each of the remote copy destination storage systems includes a remote copy destination volume, wherein a synchronous remote copy pair is set between a first remote copy destination volume in the first remote copy destination storage system and the second volume, and an asynchronous remote copy pair is set between a second remote copy destination volume in the second remote copy destination storage system and the second volume and,
before executing a copy from the first volume to the second volume in the remote copy source storage system, the remote copy source storage system suspends a remote copy from the second volume in the remote copy source storage system to the first remote copy destination volume in the first remote copy destination storage system to create a first determined backup volume in the first remote copy destination storage system and,
after the execution of the copy from the first volume to the second volume in the remote copy source storage system, the remote copy source storage system copies differential data from the second volume in the remote copy source storage system to the second remote copy destination volume in the second remote copy destination storage system to create a second determined backup volume in the second remote copy destination storage system.

2. The computing system according to claim 1, wherein,
a synchronous copy from the second volume is executed in the first remote copy destination volume included in the first remote copy destination storage system,
an asynchronous copy from the second volume is executed in the second remote copy destination volume included in the second remote copy destination storage system,
the remote copy source storage system:
sets a pair status of the pair, between the first remote copy destination volume in the first remote copy destination storage system and the second volume, to a first mode for terminating the remote copy;
when executing copy from the first volume to the second volume, changes the pair status of the pair, between the second volume and the second remote copy destination volume, to a second mode for starting the remote copy; and
asynchronously remote-copies data in an area in the second volume in which the copy from the first volume to the second volume is complete, to the second remote copy destination volume in the second remote copy destination storage system,
the remote copy source storage system includes: a first bitmap for managing the copy between the first and second volumes; and a second bitmap for managing the copy between the second volume and, of the first remote copy destination volume and the second remote copy destination volume, at least the second remote copy destination volume,
each bit in the bitmaps corresponds to each unit area in which copy target data in the first volume is stored, and
the remote copy source storage system executes remote copy, based on a difference between the first bitmap and the second bitmap, from the second volume to at least the second remote copy destination volume amongst the first remote copy destination volume and the second remote copy destination volume.

3. The computing system according to claim 1, wherein
a synchronous copy from the second volume is executed in the first remote copy destination volume included in the first remote copy destination storage system, and
an asynchronous copy from the second volume is executed in the second remote copy destination volume included in the second remote copy destination storage system.

4. The computing system according to claim 3, wherein
the remote copy source storage system sets a pair status of the pair between the first remote copy destination volume in the first remote copy destination storage system and the second volume, to a first mode for terminating the remote copy.

5. The computing system according to claim 4, wherein
when executing the copy from the first volume to the second volume, the remote copy source storage system changes the pair status of the pair between the second volume and the second remote copy destination volume, to a second mode for starting the remote copy.

6. The computing system according to claim 3, wherein
the remote copy source storage system asynchronously remote-copies data in an area in the second volume in which the copy from the first volume to the second volume is complete, to the second remote copy destination volume in the second remote copy destination storage system.

7. The computing system according to claim 1, wherein
the remote copy source storage system includes: a first bitmap for managing the copy between the first and second volumes; and a second bitmap for managing the copy between the second volume and, of the first remote copy destination volume and the second remote copy destination volume, at least the second remote copy destination volume,
each bit in the bitmaps corresponds to each unit area in which copy target data in the first volume is stored, and
the remote copy source storage system executes the remote copy, based on a difference between the first bitmap and the second bitmap, from the second volume to at least the second remote copy destination volume amongst the first remote copy destination volume and the second remote copy destination volume.

8. A backup method using a computing system,
where the computing system includes: a remote copy source storage system; and a first and a second remote copy destination storage systems, the remote copy source storage system includes: a first volume accessed by a host computer; and a second volume, wherein a local copy pair is set between the first volume and the second volume, and each of the remote copy destination storage systems includes a remote copy destination volume, with a synchronous remote copy pair set between a first remote copy destination volume in the first remote copy destination storage system and the second volume, and an asynchronous remote copy pair is set between a second remote copy destination volume in the second remote copy destination storage system and the second volume,
the backup method comprising the steps of:
before executing a copy from the first volume to the second volume in the remote copy source storage system, suspending by the remote copy source storage system of a remote copy from the second volume in the remote copy source storage system to the first remote copy destination volume in the first remote copy destination storage system to create a first determined backup volume in the first remote copy destination storage system; and
after the execution of the copy from the first volume to the second volume in the remote copy source storage system, the remote copy source storage system copies differential data from the second volume in the remote copy source storage system to the second remote copy destination volume in the second remote copy destination storage system to create a second determined backup volume in the second remote copy destination storage system.

9. A storage system comprising:
a first volume accessed by a host computer;
a second volume, wherein a local copy pair is set between the first volume and the second volume; and
a control unit for controlling the first volume and the second volume,
wherein the storage system is connected to a first and a second remote copy destination storage systems each including a remote copy destination volume, wherein a synchronous remote copy pair is set between a first remote copy destination volume in the first remote copy destination storage system and the second volume, and an asynchronous remote copy pair is set between a second remote copy destination volume in the second remote copy destination storage system and the second volume, and the storage system serves as a remote copy source for the remote copy destination storage systems, wherein,
the control unit, before executing a copy from the first volume to the second volume in the storage system, suspends a remote copy from the second volume in the storage system to the first remote copy destination volume in the first remote copy destination storage system to create a first determined backup volume in the first remote copy destination storage system, and
after the execution of the copy from the first volume to the second volume in the storage system, the remote copy source storage system copies differential data from the second volume in the remote copy source storage system to the second remote copy destination volume in the second remote copy destination storage system to create a second determined backup volume in the second remote copy destination storage system.

* * * * *